H. FLECK.
MANUFACTURE OF BARIUM OXID.
APPLICATION FILED NOV. 5, 1917.
1,326,332. Patented Dec. 30, 1919.
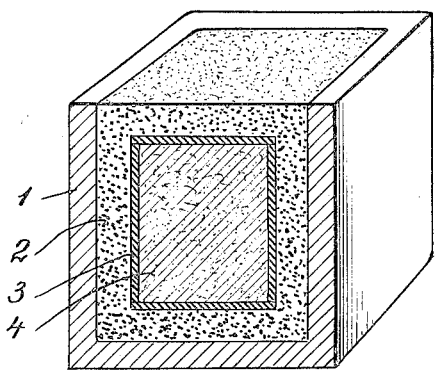
Herman Fleck  Inventor
By his Attorneys
Pennie Davis Marvin & Edmonds

UNITED STATES PATENT OFFICE.

HERMAN FLECK, OF GOLDEN, COLORADO.

MANUFACTURE OF BARIUM OXID.

1,326,332.   Specification of Letters Patent.   Patented Dec. 30, 1919.

Application filed November 5, 1917. Serial No. 200,286.

*To all whom it may concern:*

Be it known that I, HERMAN FLECK, a citizen of the United States, residing at Golden, in the county of Jefferson and State of Colorado, have invented certain new and useful Improvements in the Manufacture of Barium Oxid; and I do hereby declare the following to be a full, clear, and exact description of the invention, such as will enable others skilled in the art to which it appertains to make and use the same.

This invention relates to the production of barium oxid, on a commercial scale, from barium carbonate, by heating a mixture of barium carbonate and finely divided carbon.

According to the present invention, the carbon used in admixture with the barium carbonate for effecting its reduction is substantially free from inorganic material or ash, carbon as free as possible from such material being used. Suitable forms of carbon are soot, lamp black and charcoal, but the coke from oil or petroleum is especially suited for this purpose.

Carbon in the form of petroleum coke is much more refractory than some other forms of carbon. For this reason it does not burn out to as great an extent at low temperatures during the gradual heating up of the mass and therefore a lesser quantity may be employed. With petroleum coke a high temperature may be reached in a restricted air supply before vigorous combustion sets in and therefore practically all the carbon is left undisturbed for reaction with the barium carbonate. Erratic results are avoided because the reaction is not so sensitive to slight and unavoidable conditions of heat application, barometric changes, draft changes, etc.

The barium carbonate and the carbon are mixed together, according to the present invention, in such proportions that there is less than the theoretical quantity of carbon required for the reduction of the barium carbonate according to the following equation:

$$BaCO_3 + C = BaO + 2CO,$$

so that it will effect only a partial reduction of the barium carbonate. If the theoretical quantity of carbon is mixed with the barium carbonate, some unreduced carbon will remain in the product mixed with the barium oxid, unless the charge is heated to the dissociation temperature of the barium carbonate or unless the reaction is carried out under such conditions as to allow free diffusion of carbon dioxid throughout the reacting mass to burn out the excess of carbon at a temperature below that of dissociation of the barium carbonate.

The dissociation point of barium carbonate alone is about 1352° C. at 750 mm. At such high temperatures, it is difficult to obtain suitable containers for the highly basic barium oxid produced. By using less than the theoretical quantity of carbon required, as above stated, the necessity for heating to the decomposition temperature of barium carbonate is avoided, and a product is produced by a partial reduction of the barium carbonate which is converted into barium oxid free from carbon. This will be more readily appreciated from an understanding of the following considerations: If no carbon is employed it would be necessary in dissociating the barium carbonate at 760 mm. pressure to employ a temperature of 350° C. or higher. At this temperature an equilibrium at which the dissociation is substantially 50% complete would be reached. At lower temperatures, however, dissociation would occur, but the state of equilibrium would be reached before dissociation had proceeded to 50%. For example, at 1200° C. equilibrium would be reached when 5% of the barium carbonate had been dissociated. There are three possibilities of driving the dissociation to completion.

(1) By raising the temperature,
(2) By reducing the pressure and
(3) By driving off the $CO_2$ by means of an inert gas so that the backward pressure of the $CO_2$ is removed and liberation of further quantities thereof is necessary to establish equilibrium.

If we assume that some carbon is added, two reactions occur simultaneously when the mass is heated.

(1) $BaCO_3 + heat = CO_2 + BaO$.
(2) $BaCO_3 + C = 2CO + BaO$ or
$BaCO_3 + heat = CO_2 + BaO$ and
$CO_2 + C = 2CO$ It is apparent that in reaction (1) A single volume of carbon dioxid gas is formed and that the gas is reactive in the direction opposite to the equation, whereas, in reaction (2) Double the volume of a non-reactive or inert gas is formed.

Obviously, therefore, barium oxid can be formed from barium carbonate without the theoretical quantity of carbon and without heating to a temperature of complete dissociation of barium carbonate.

The production of a carbon-free barium oxid is desirable for many purposes, as where the barium oxid is to be used for the manufacture of barium dioxid and where the carbon, if present, would cause a reversion of barium oxid to barium carbonate and would prevent the formation of a corresponding quantity of barium dioxid.

The carbon used, accordingly, in the process of the present invention, is a little less than the theoretical quantity of carbon necessary for the reaction $BaCO_3 + C = 2CO + BaO$, to insure an oxid free from carbon. The carbon acts to bring about the reduction of the barium carbonate to approximate completion and it also provides a reducing agent for the carbon dioxid liberated by any dissociated barium carbonate, this carbon dioxid being reduced by the carbon to carbon monoxid according to the following equation:

$$CO_2 + C = 2CO,$$

from which it will be seen that the volume of gas is doubled so that the gases will be mechanically swept out from the reacting mass during the progress of the process and thereby eliminated from further reaction and recombination.

I have found that the reaction can be carried out in a particularly advantageous manner in spite of the highly basic character of the barium oxid by forming the charge into a dense compact mass and by packing it in a wooden box which serves as a container for the charge and which enables the charge to be compacted to the required extent therein. The wooden box containing the compact charge is placed in a clay sagger and separated from the walls thereof by means of cinders, coke, coal, fire clay or other refractory material, which serves to insulate the box and its charge from the walls of the sagger and to protect the box itself from rapid oxidation. When the charge is heated in this manner, the wooden box is converted into charcoal and furnishes a protecting layer which prevents the barium oxid from coming in contact with the walls of the container. Inasmuch as the wooden box is rigid, the refractory material can be packed tightly between it and the walls of the sagger so that the box will retain its form even after carbonization. Rapid oxidation of the charcoal by air or by the gases of combustion is further prevented by the surrounding refractory material.

I have found that if the carbonate mixture is not packed hard enough, the oxid will shrink excessively and fuse down, with resulting increased tendency to escape and come in contact with the walls of the container which are of a silicious character and which combine with the highly basic oxid to form a flux or slag. I have found it important to pack the boxes so that one pound of the mixture will have a volume of not materially more than 17 cubic inches. This compacting of the charge may be effected in various ways, as by briqueting or by machine tamping. The mixture may be promoted by steaming or mixing with water, it being possible in this way to remove the air from between the particles of the charge. So, also, the addition of a slight amount of moisture, amounting only to from .5 to 5% renders it materially easier to pack the charge to the proper density. The removal of air from the charge prior to or during compacting may be effected by treatment *in vacuo*, by the briqueting operation, by steaming, or preferably by effecting the mixture of the carbon and carbonate in water. In the latter case, an intimate mixture of the carbonate and carbon can be made into the form of a thick pulp which can be filtered in a filter press and dried.

The compacting may, with advantage, be effected directly in the wooden box which is to contain the charge at the beginning of the process, the box serving as a rigid container and withstanding the pressure or blows applied to the charge. When the charge is thus compressed within the box and the box inclosed by refractory material within a sagger, the box will become charred and form an inert carbon lining separating the charge from the surrounding refractory material and from the walls of the sagger. Disintegration of the charge, such as would tend to take place with briquets or cakes containing moisture and giving off water vapor or other gases during the early stages of the heating, is prevented, and the charge protected by the box and the charcoal formed therefrom until the reaction has progressed to such an extent that the charge no longer needs this protection.

The heating of the charge may be accomplished in an electric furnace, in a muffle, or in a kiln. I have found the ordinary type of kilns used in pottery manufacture well adapted for the practice of the invention, since they are easily controlled, have a large capacity, and permit the ready withdrawal of the flame or fire after the operation is complete,—something which is desirable and even necessary in order to prevent re-carbonization and destruction of the barium oxid, during the cooling process, where this takes place within the kiln.

The charge is first heated slowly and the temperature brought up to about 800° C. in about 4 to 15 hours, the moisture and volatile matter being carried off slowly during this preliminary heating and the charge itself being brought to a uniform temperature.

Thereafter, the temperature is rapidly raised to the reaction temperature, which is from 1150 to 1350° C. depending on the grade of barium oxid desired. The time required for effecting this step of the process varies, for example, between 6 and 24 hours. During this second stage, the carbonate is decomposed and the reaction mass formed into a dense, non-porous cake, which prevents later fusion during the progress of the reaction.

At a certain stage of the reaction there is formed a mixture of barium oxid and barium carbonate in equimolecular proportions which melts or becomes semi-fused around 950 to 1150° C. As the decomposition of the barium carbonate proceeds, the melting point of the mixture increases,—due to the increased amount of barium oxid present. Since barium carbonate is a poor conductor of heat, the outer shell of the mass will tend to react first and the semi-pasty condition will be reached while the interior of the mass is of a more rigid character. As the reaction progresses, the outer shell will in turn become converted into a hard and firm shell while the interior of the mass, which reacts more slowly, is still in a semi-pasty condition. The reaction is accordingly so carried out that this outer shell is formed to protect the inner mass and to prevent the entire mass from fusing down at the same time. This result is effected, as above described, by quickly heating to the reacting temperature so that the reaction takes place on the outside of the charge and forms a shell containing a small amount of barium carbonate and a larger amount of barium oxid of higher melting point before the inside of the mass reaches the semi-pasty condition, the higher melting point of the shell thereby protecting and supporting the mass during its reaction.

After the preliminary heating is completed, the temperature is maintained at the reaction temperature to permit the charge to become thoroughly and uniformly heated and for the reaction to become complete. This requires, for example, from 6 to 30 hours, and depends upon such considerations as the conditions within the furnace, and the nature of the charge. When the temperature is carried to around 1350° C., the resulting oxid can be made of a purity of about 99%. When the heating is carried out at about 1300° C. the oxid is about 85 to 90% pure. The preferred temperature is between 1300 and 1350° C.

When the time of heating is completed, the fires are pulled, or the source of heat is removed, and reconversion of the barium oxid into barium carbonate, by the carbon dioxid from the source of heat, is thereby prevented.

The accompanying drawing illustrates the manner of forming the charge for the practice of the invention, this drawing showing partly in section and partly in perspective a sagger containing the charge ready for the beginning of the process. The sagger 1 is of refractory silicious material capable of withstanding the temperatures used in the process and within the sagger, and separating its walls from the wooden box 3 is the refractory material 2, of the character above described, which can be packed and compressed around the box and between it and the walls of the sagger, so that the box is firmly wedged and held in place. Within the box 3 is the charge 4 in its compressed and compacted form. Inasmuch as the box forms a rigid container, it permits both the charge within it and the refractory material surrounding it to be tightly packed, thereby leaving less room for access of gases, while nevertheless permitting the escape from the charge of the gases of reaction. The box, as above pointed out, prevents disintegration of the charge by the escape of moisture and other gases, and protects the charge until the protective layer has been formed thereon, as above described. When this layer of barium oxid forms as a shell before the main mass of the charge has undergone reaction, this shell assists the charred box in maintaining the shape and form of the mass, so that, after reaction is completed, the cooled cakes remain in contact and their removal from the container is an easy matter. At the end of the reaction, the charred box is readily removable from the cake so that the cake is obtained free from an excess of carbon. The charcoal of the charred box moreover remains intact so that it is readily removed at the end of the reaction.

Instead of a wooden box, other close-fitting carbon forms may be used provided they are likewise adapted to have the charge packed therein under pressure or impact of considerable force, and are capable of supporting the compact charge and of being in turn supported during the reaction.

Where the charge is briqueted and introduced into the wooden containers, in the resulting compact form, similar advantages to those above mentioned will be obtained. The briquets will be protected from disintegration while the protecting oxid sheath or layer is being formed, because of the close contact of the carbon wall of the container with the barium carbonate briquets, the carbon assisting in the interaction required for the production of the barium oxid shell. The semi-fused mass within the oxid shell will similarly be protected and supported, while the finished compact mass may be easily removed from the container.

It will accordingly be seen that the process of the present invention, in its various aspects involves features of advantage which combine to give a simple but highly advantageous commercial process for the production of barium oxid of high purity on a commercial scale. The carbon used in making up the charge is of high purity so that it introduces a minimum of silicious material to react with the strongly basic barium oxid. The carbon is used in the charge in slightly less than molecular proportions so that complete reduction is not attempted and so that residual carbon in the charge will be avoided. The charge, moreover, is compressed into a dense compact mass, or into dense compact masses, and is so heated that an outer protecting shell is formed to protect the main mass of the charge while it is in its semi-pasty condition. The compressed charge is contained within wooden boxes or like containers in which the charge can be compressed or tamped and which can be in turn supported by a surrounding mass of refractory material within the sagger. The process is, moreover, so carried out that the charge is first heated gradually to remove the moisture and volatile matter, and then quickly heated to the reaction temperature to bring about the formation of the protective layer of oxid, the formation of which is promoted by the close contact of the carbonized container, after which the reaction is maintained at the proper temperature until its completion.

The use of clay saggers for containing the charge has the further advantage that they are to a certain extent porous, thereby permitting such slight penetration therethrough as may be desirable in the completion of the reaction.

The product produced according to the present invention, as above pointed out, is of high purity, being substantially free from silicious matter introduced with the carbon and being likewise free from any excess of carbon. This product is accordingly well adapted for use for purposes where a product of high purity is desired, for example, in the production of barium dioxid by oxidation.

I claim:

1. The method of manufacturing barium oxid from barium carbonate, which comprises mixing the barium carbonate with petroleum coke, and heating the resulting mixture in a non-silicious container to the reduction temperature; substantially as described.

2. The method of manufacturing barium oxid from barium carbonate, which comprises mixing the barium carbonate with somewhat less than the theoretical amount of carbon required for the reduction, and heating the mixture to the reduction temperature, whereby a product free from carbon is produced; substantially as described.

3. The method of manufacturing barium oxid from barium carbonate, which comprises mixing the barium carbonate with carbon and heating the mixture to the reduction temperature in a porous container, permitting the access of the heating gases during the reduction, whereby the complete removal of carbon is promoted; substantially as described.

4. The method of manufacturing barium oxid from barium carbonate, which comprises mixing the barium carbonate and carbon, compressing the mixture until a pound thereof has a volume of not more than about 17 cubic inches, and heating the compressed mixture to the reduction temperature, whereby the production of a dense, compact product is promoted; substantially as described.

5. The method of manufacturing barium oxid from barium carbonate, which comprises mixing the barium carbonate with carbon, compressing or compacting the mixture in a wooden box, surrounding the wooden box with refractory material in a refractory container, heating the mixture to the reduction temperature with the accompanying carbonization of the wood and protection of the charge, and continuing the heating until the reaction has terminated; substantially as described.

6. The method of manufacturing barium oxid from barium carbonate, which comprises mixing the barium carbonate with carbon, forming the charge into a dense, compact mass, protecting the mass by carbonaceous material, heating the charge rapidly to cause reaction in the outer layers thereof before reaction in the inner portions takes place, thereby forming a dense shell high in barium oxid, and continuing the heating at the reaction temperature until the reaction has terminated; substantially as described.

7. The method of manufacturing barium oxid from barium carbonate, which comprises mixing the barium carbonate with carbon, compressing the charge in a wooden box, supporting the wooden box in a suitable refractory container, heating the charge to drive off moisture and volatile matter, then quickly heating the charge to the reaction temperature to cause reaction in the surface layers thereof with resulting formation of a shell of barium oxid, and continuing the heating until the reaction has been completed throughout the charge; substantially as described.

8. The method of manufacturing barium oxid from barium carbonate, which comprises heating a mixture of barium carbonate and carbon in a compressed state, quickly to the reaction temperature to cause reaction in the outer layers thereof before reaction in the inner portions takes place, thereby forming a protecting shell of barium oxid, and continuing the heating until the inner portions of the charge have also been converted into barium oxid; substantially as described.

9. The method of manufacturing barium oxid from barium carbonate, which comprises mixing the barium carbonate with somewhat less than the theoretical amount of carbon required for the reduction, compressing the charge, protecting the charge by surrounding carbonaceous material during its heating, heating the charge to the reaction temperature to cause reaction in the outer layers thereof to take place rapidly and thereby forming a shell of barium oxid, and continuing the heating at the reaction temperature until the remainder of the charge, supported by the barium oxid shell, has been converted into barium oxid; substantially as described.

10. The method of manufacturing barium oxid from barium carbonate, which comprises mixing the barium carbonate with carbon substantially free from silicious ash, the carbon being added in somewhat less than the theoretical amount required for the reduction, compressing the mixture, inclosing it in its compressed state in a wooden container, supporting the wooden container in a refractory container, heating the charge slowly to a temperature of about 800° C. to remove water and volatile matter, then heating the charge quickly to the reaction temperature, and continuing the heating at the reaction temperature to complete the reaction; substantially as described.

11. The method of manufacturing barium oxid from barium carbonate, which comprises mixing the barium carbonate with carbon, heating the mixture rapidly to the reaction temperature to cause reaction in the surface layers of the charge with resulting formation of a refractory surface layer of barium monoxid, and continuing the heating at the reaction temperature to cause the inner portions of the charge to react and to convert the semi-pasty mass of barium carbonate and barium oxid produced during the reaction into a porous mass of barium oxid within the protecting layer of barium oxid; substantially as described.

12. The method of manufacturing barium oxid from barium carbonate, which comprises mixing the barium carbonate with carbon in somewhat less than the theoretical amount required for the reduction, packing the mixture into a wooden box under pressure, inclosing the wooden box and mixture within a refractory container and surrounding the box with loose refractory material, heating the charge to cause carbonization of the box and removal of volatile constituents with accompanying formation of a carbon lining surrounding the mixture and with support of the charge and prevention of disintegration during the escape of volatile constituents, heating the charge rapidly to the reaction temperature to cause reaction in the outer portions thereof with resulting formation of a protective coating of barium oxid, continuing the heating to complete the reaction, and cooling the resulting product, whereby a product is produced readily removable from its container, and protected from objectionable silicious impurities; substantially as described.

13. A method of manufacturing barium oxid which comprises mixing barium carbonate with carbon, compacting the mass in a wooden receptacle, supporting said receptacle in a refractory sagger in spaced relation with the walls thereof and subjecting the mass to a temperature appropriate to the formation of the oxid.

In testimony whereof I affix my signature.

HERMAN FLECK.